(No Model.)
C. L. DITTEMORE.
HORSE HAY RAKE.
No. 497,639. Patented May 16, 1893.
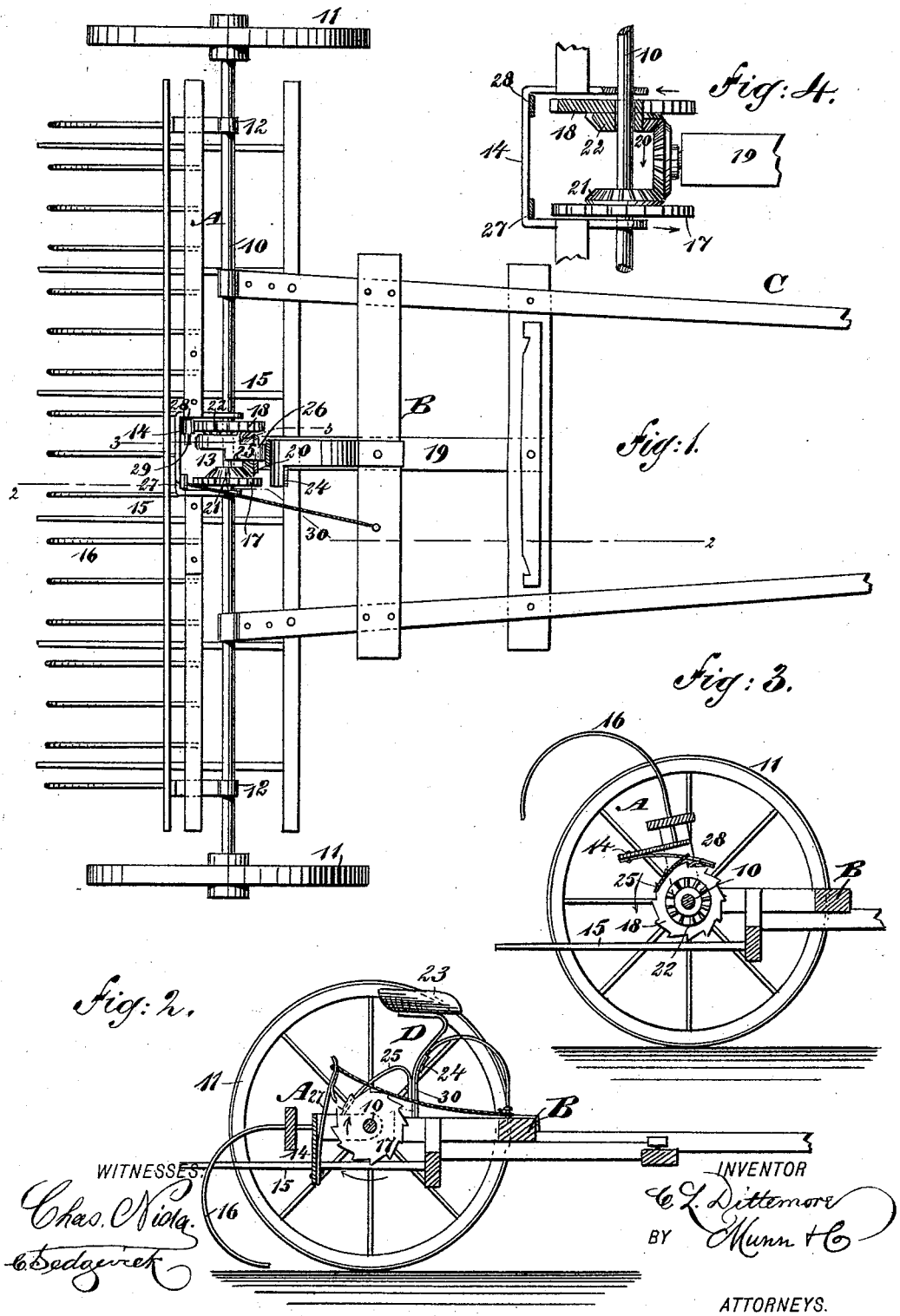
WITNESSES:
Chas. Niola.
C. Sedgwick.
INVENTOR
C. L. Dittemore
BY Munn & Co.
ATTORNEYS.

UNITED STATES PATENT OFFICE.

CHARLES L. DITTEMORE, OF POST FALLS, IDAHO.

HORSE HAY-RAKE.

SPECIFICATION forming part of Letters Patent No. 497,639, dated May 16, 1893.

Application filed October 25, 1892. Serial No. 449,919. (No model.)

*To all whom it may concern:*

Be it known that I, CHARLES LEWIS DITTEMORE, of Post Falls, in the county of Kootenai and State of Idaho, have invented a new and Improved Horse Hay-Rake, of which the following is a full, clear, and exact description.

My invention relates to an improvement in horse hay rakes, and the object of the invention is to provide an attachment to the rake of a simple, durable and economic character, whereby the rake head may be elevated and lowered at the option of the driver, and whereby also both the upward and downward movement of the rake head will be accomplished in a steady and uniform manner.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of the horse hay rake having the improvement applied thereto. Fig. 2 is a vertical transverse section taken practically on the line 2—2 of Fig. 1. Fig. 3 is a transverse section taken essentially on the line 3—3 of Fig. 1; and Fig 4 is a detail partial plan and partial horizontal sectional view of the gearing of the attachment.

In carrying out the invention the head A of the rake, which head may be of any approved construction, is mounted to turn upon an axle 10, carrying the supporting wheels 11 of the machine; and the manner of connecting the head with the axle usually consists in attaching to the head sleeves 12, which are loosely mounted upon the axle. At each side of the center of the head, however, an opening 13, is made, and in this opening a yoke 14, is secured, or a casing of any kind approximating that shape, and the outer ends of the yoke are loosely mounted upon the axle so that the yoke does not at all interfere with the upward or downward movement of the rake head upon the axle. The platform B of the rake to which the shafts C, are secured, is also mounted upon the axle of the rake ordinarily by means of sleeves, and the platform is provided with a series of fingers 15, projecting horizontally and rearwardly from it between the teeth 16 of the rake head, these fingers being adapted to strip the hay from the teeth when the rake head is elevated. Within the casing or yoke 14 a ratchet wheel 17, is securely fastened upon the axle, turning with it, the supporting wheels 11 being also securely fixed to the axle; and opposite the ratchet wheel 17 a second ratchet wheel 18, is located upon the axle, but this latter wheel is loosely mounted, turning freely upon the axle.

A center beam 19, is projected from the platform B between the two ratchet wheels 17 and 18; and upon the rear end of this projecting beam a beveled pinion or gear 20 is mounted to turn, and this beveled pinion or gear meshes with two similar gears designated respectively as 21 and 22, these gears being attached to the inner faces of the ratchet wheels, so that as the axle revolves the ratchet wheel 17 is turned in one direction and the opposite ratchet wheel 18 in the contrary direction. The ratchet wheel 17 moves with the axle in a forwardly direction and the ratchet wheel 18 is turned in a rearwardly direction.

Upon the central beam 19 a standard D, is erected, upon which the driver's seat 23, is secured. The rear face of the standard is curved, as shown best in Fig. 2, and upon the right-hand side of the curved portion of the standard a lug 24, is horizontally projected, and a tongue 25, is downwardly curved from the rear face of the standard over the axle between the ratchet wheels 17 and 18, and this tongue upon the rear portion of its left-hand edge has formed therein a recess 26.

Upon the back of the casing or yoke 14 spring latches 27 and 28, are secured at their lower ends, one latch being located at each side of the casing or yoke and opposite each of the ratchet wheels. Each latch is provided with a head adapted to fit between the teeth of the ratchet wheels, and the right-hand latch 27, is opposite the lug 24 upon the standard, and is much longer than the opposite latch 28, which latter latch is provided with an inwardly extending lip 29 at the head portion thereof; and the upper portion of the right-hand latch 27, has secured to it a cable or chain 30, which is led forward and is attached to the platform in such manner that the rider may press downward upon the cable or chain with his foot.

In the operation of this rake, when it is desired to dump the load gathered by the teeth, the driver presses downward upon the chain or cable 30 and thereby causes the head of the latch 27 to engage with the teeth of the ratchet wheel 17; and by maintaining the latch in engagement with this ratchet wheel the rake head is steadily and uniformly carried upward, and when the rake head has assumed its uppermost position the head of the latch 27 will engage with the lug 24 on the standard and will be disengaged from its ratchet wheel. Meantime the lip 29 of the opposite latch has been riding up the convexed surface of the tongue 25, and the moment that the lug 24 releases the latch 27 from the ratchet wheel 17 the tongue of the opposite latch 28 will have reached the recess 26 and will be released from engagement with the tongue 25, whereupon the latch 28 will spring downward and engage with the teeth of the ratchet wheel 18, which moving in a rearwardly direction will lower the rake as steadily and as evenly as it was elevated.

This attachment may be made to any rake head, and as has heretofore been stated it is not only simple, durable and economic but it insures the head of the rake being raised and lowered with ample rapidity, and without the sudden and jerking movement given to the ordinary dumping mechanisms, which movements tend to dislocate the teeth and to injure the rake generally.

The axle is preferably driven by mounting the wheels loosely upon it and placing in the hubs of the wheels suitable ratchets engaging with the axle.

The train of gearing utilized for raising and lowering the rake may be varied as to combination, in order that the rake may be operated rapidly or slowly; as, for instance, the gear wheels 21 may be made larger and the gear 22 smaller, or vice versa.

Having thus described my invention, I claim as new and desire to secure by Letters Patent—

1. The combination, with a rake head and a supporting axle upon which the rake is pivotally attached, of ratchet wheels mounted upon the axle and turning in opposite directions, latches carried by the rake head, one adapted for engagement with each ratchet wheel, and trip devices with which the latches engage, substantially as shown and described.

2. In a rake head, the combination with an axle capable of revolving and a rake head loosely mounted upon the axle, of two ratchet wheels mounted upon the axle and turning in opposite directions, spring latches carried by the rake head, one opposite each ratchet wheel and adapted for engagement therewith, a trip device consisting of a stop to engage with one latch, and a recessed tongue to engage with the other latch, and a shifting mechanism connected with one of the latches, as and for the purpose specified.

3. The combination, with an axle capable of revolving and a rake head loosely mounted upon the axle and capable of turning therewith, of two ratchet wheels, one secured to the axle and the other loosely mounted thereon and gears capable of converting motion connecting the two ratchet wheels, whereby the loose wheel is turned in a contrary direction to the fixed wheel, spring latches located one opposite each ratchet wheel and adapted for engagement therewith, a standard located in front of the axle and provided with a stop upon one side adapted to be engaged by one of the latches, and a tongue projected from the standard upon which the other latch is adapted to ride, the tongue being provided with a recess in one of its edges, and a shifting mechanism connected with the latch that engages with the stop, as and for the purpose specified.

CHARLES L. DITTEMORE.

Witnesses:
 CHARLES W. CLARK,
 GEO. A. MANNING.